United States Patent [19]

Goss et al.

[11] 4,280,766
[45] Jul. 28, 1981

[54] OPTICAL GYROSCOPE SYSTEM

[75] Inventors: Willis C. Goss, Altadena; Raymond Goldstein, Monrovia, both of Calif.

[73] Assignee: The United States of America as represented by the Administrator of the National Aeronautics and Space Administration, Washington, D.C.

[21] Appl. No.: 972,252

[22] Filed: Dec. 22, 1978

Related U.S. Application Data

[63] Continuation-in-part of Ser. No. 853,349, Nov. 21, 1977.

[51] Int. Cl.³ ............................................. G01C 19/64
[52] U.S. Cl. ................................. 356/350; 350/370; 356/351
[58] Field of Search ............................... 356/350, 351

[56] References Cited

PUBLICATIONS

"Fiber Optic Laser Gyro Signal Detection and Processing Technique"; Martin et al.; Proceedings of the Spie Technical Symposium, Mar. 1978.

*Primary Examiner*—Vincent P. McGraw
*Attorney, Agent, or Firm*—Monte F. Mott; John R. Manning; Paul F. McCaul

[57] ABSTRACT

An optical gyroscope is described of the type which passes light beams in opposite directions through a single mode fiber optic wave guide that extends in a circle or coil, and which enables measurement of rotation rate of the coil by measuring the relative phase shifts of the beams by interferometric techniques, wherein simplification and enhanced accuracy are obtained. Beam splitting and phase shifting of the light is facilitated by utilizing brief pulses of light and by using light-controlling devices which are operated for a brief time only when the light pulse passes in one direction through the device but not at a different time when the pulse is passing in the opposite direction through the device. High accuracy in rotation measurement is achieved at both very slow and very fast rotation rates, by alternately operating the system so that at zero rotation the interfering waves are alternately 90° out of phase and in phase. Linear polarization of the light beams is maintained by coiling the full length of the optic fiber in a single plane so that bending stresses induce a birefringence in the waveguide, thus altering the propagation constants of the two polarized modes and decoupling them.

7 Claims, 10 Drawing Figures

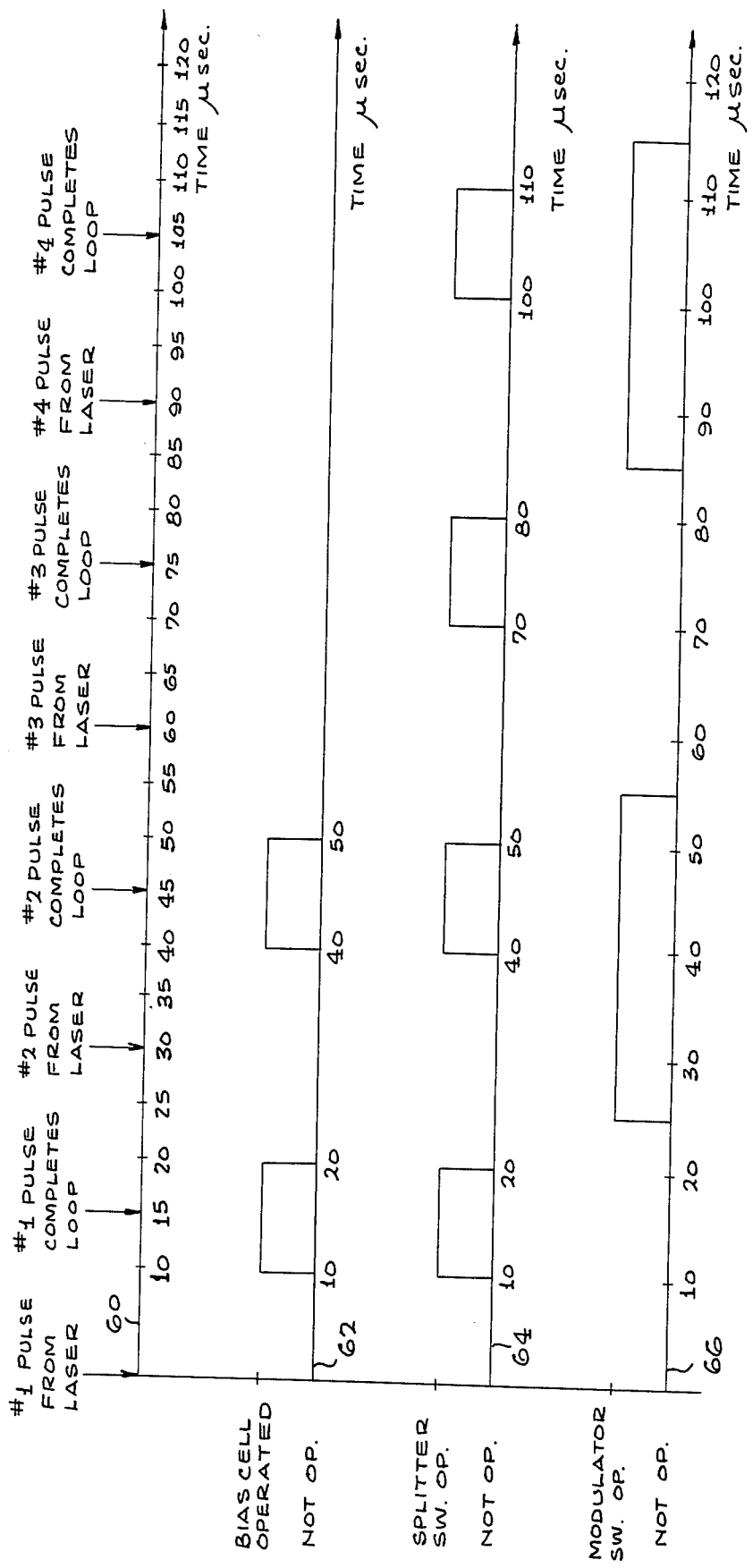

OPTICAL GYROSCOPE SYSTEM

ORIGIN OF THE INVENTION

The invention described herein was made in the performance of work under a NASA contract and is subject to the provisions of Section 305 of the National Aeronautics Space Act of 1958, Public Law 85-568 (72 Stat. 435; 42 USC 2457).

CROSS REFERENCE TO RELATED APPLICATION

This is a continuation-in-part of our earlier patent application Ser. No. 853,349 filed Nov. 21, 1977 for OPTICAL GYROSCOPE.

BACKGROUND OF THE INVENTION

Optical interferometer gyroscopes can sense rotation by measuring the difference in time it takes for light or other eletromagnetic waves to pass in opposite directions through a common path loop whose rotation is to be measured. The light beam moving in the direction of rotation will arrive at the detectors later than the light beam moving opposite to the direction of rotation around the loop, and therefore the two light beams will be out of phase. If the two beams are only slightly out of phase, then the light intensity at the detector will not vary significantly for small changes in phase difference between the two beams, because the light intensity vs. phase difference curve will be at a location of substantially zero slope. As described in our earlier patent application, however, sensitivity can be greatly increased by shifting the phase of one of the beams by 90°, so that the detector is operating at a point on the light intensity vs. phase difference curve, which is of maximum slope, and therefore small variations in phase difference will result in large variations in light intensity.

Many practical difficulties hamper the development of a practical optical interferometer gyroscope system. One difficulty is in the generation of a 90° phase shaft between waves travelling in opposite directions. Such a shift can be achieved by the use of a nonreciprocal device such as a Faraday cell, which utilizes a magnetic field to advance the phase of light travelling in one direction and delay the phase of light travelling in the opposite direction, but such devices have been found to be cumbersome and difficult to embody in single mode waveguide form. Another difficulty is that identical non-circular polarization states must be maintained throughout the length of the waveguide in order to obtain stable outputs. Otherwise, minor fluctuations in temperature, acceleration, stress, electric or magnetic field gradients, or even long term fiber relaxation will introduce large random phase changes at the outputs. Still another difficulty is that, while a 90° offset provides high sensitivity for small rotation rates or rates for which the rotation induced phase offset approaches an integer multiple of 180°, it is not desirable at rates where the rotation adds a phase difference close to an odd multiple of 90°, because the system then becomes insensitive and the readings become ambiguous. An optical interferometer gyroscope system which could be constructed compactly and which could provide high accuracy and definiteness throughout a wide range of rotation rates, would facilitate the construction of practical gyroscope systems.

SUMMARY OF THE INVENTION

In accordance with one embodiment of the present invention, a gyroscope utilizing optical or other electromagnetic waves is provided, which can produce accurate and definite rotation rate and relative angular position indications throughout a wide range of rotation rates, utilizing a relatively compact, reliable, and low cost construction. The gyroscope utilizes brief pulses of light, which are split into two beam portions to travel in opposite directions through an optical loop such as a multiturn single mode optical fiber. A 90° phase shift is imparted to one beam portion but not the other, by utilizing a phase shifting device which may be bi-directional, but which is operated only during the passage of one of the beam portions and not during the passage in the opposite direction of the other beam portion. The same time-dependent operation of a bi-directional device can be utilized to split the initial beam so that, unlike a conventional beam splitter which loses one half of the beam, substantially all of the beam is passed through the splitter.

In order to provide an accurate and definite measure of high rotation rates, as well as high sensitivity to low rotation rates, the system is operated in two modes at different times. In a first mode described earlier, one beam portion is shifted 90° relative to the other one which travels in the opposite direction through the loop, to provide a 90° offset of the interfering beam portions, which produces the highest sensitivity at low rotation rates or rates for which the rotation-induced phase offset approaches in integer multiple of 180°. In a second mode of operation, the 90° phase shifting device is not operated, so that the beam portions are out of phase by only the angle resulting from rotation of the loop. The second mode provides the most accurate and definite measurements of rotation rates which produce a phase difference between the beam portions of nearly an odd multiple of 90°. Information from the two modes of operation can be combined to provide a continuous read-out having high accuracy and definiteness over a wide range of rotation rates.

The establishment and maintenance of linear polarization of the light beam about a particular plane, can be achieved by inducing stress birefringence with a fixed orientation into an optical fiber, thus altering the propagation constants and decoupling the polarized modes. This can be accomplished by winding the optical fiber smoothly about a coil form having a relatively small radius of curvature, taking care that the fiber curvature remains entirely in the plane of the coil. The free ends of the fiber which couple to the rest of the optical system must be similarly stressed.

The novel features of the invention are set forth with particularity in the appended claims. The invention will be best understood from the following description when read in conjunction with the accompanying drawings.

BRIEF DESCRIPTION OF THE DRAWINGS

FIG. 5 is a timing diagram representation showing the sequence of operation of the system of FIG. 2.

DESCRIPTION OF THE PREFERRED EMBODIMENTS

Figure 1:
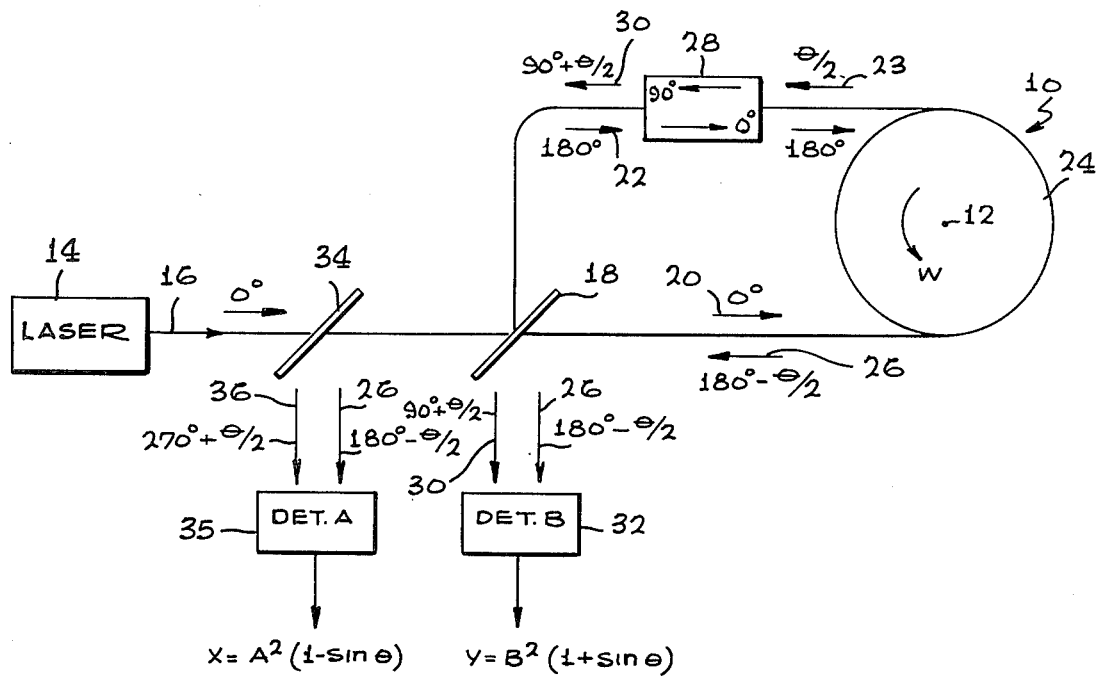
FIG. 1 is a simplified representational view of an optical gyroscope system constructed in accordance with the present invention, showing one mode of operation thereof.

FIG. 1 illustrates an optical gyroscope 10 which can indicate rotation thereof about an axis 12. The gyroscope includes a laser 14 whose output is a single beam 16 which passes through a beam splitter 18 that divides it into two beams labelled 20, 22. The two beams 20, 22 pass in opposite directions through an optical fiber loop 24 formed by an optical fiber wound into numerous turns. One of the beams 20 which passes in the direction of rotation W of the loop emerges as a beam 23 delayed in phase by $\theta/2$. The other beam 22 emerges from the loop as a beam 26 which is advanced in phase by $\theta/2$. The beam 23 passes through a bias cell 28 that delays the beam 90° to produce a beam 30. Portions of the two returning beams 26, 30 are combined by way of the beam splitter 18 onto a detector 32 which detects the intensity of light formed by the interference pattern of the two beams 26, 30. The other portions of the beams 26, 30 reach another splitter 34 which directs them onto another detector 35. It may be noted that the beam 30 under goes 180° phase shifts when reflected from the beam splitter 18, so that one of the beams 36 reaching the detector 35 is delayed in phase with respect to the beam 30 from which it is derived.

Figure 4:
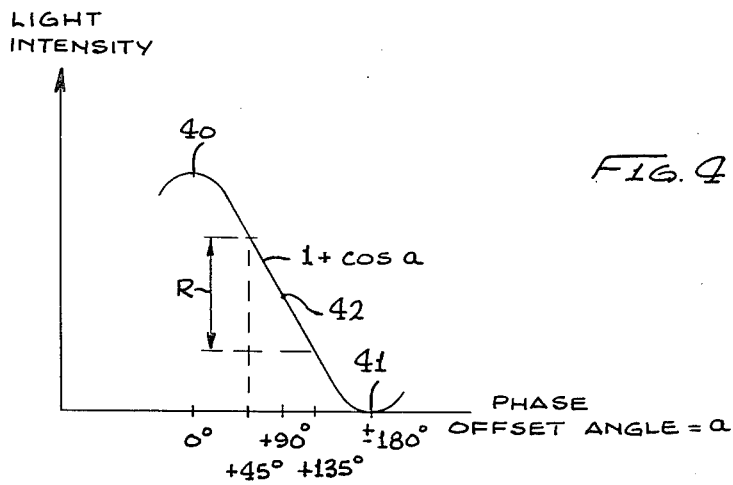
FIG. 4 is a graph showing the variation in light intensity on the detectors of the gyroscope of FIG. 2, as the phase difference varies.

The outputs of the two detectors 32, 35 vary considerably with small variations in $\theta/2$ (which represents rotation of the loop 24). This is because the pair of beams falling on each detector are close to 90° out of phase when $\theta$ is small. FIG. 4 shows how the light intensity of the interference pattern varies with the difference in phase between the two beams falling on a detector. When the two beams are at a zero phase difference, such as at point 40, the slope of the curve is zero, and therefore small variations in the phase difference (caused by changes in $\theta$) produce a negligible change in light intensity. However, when the two beams operate near the point 42 where they are 90° out of phase, any slight change in their phase relationship from the initial 90° difference results in a substantial change in the light intensity sensed by the detector. Thus, high sensitivity in detecting small rotation rates of the fiber optic loop, can be achieved by causing the two beams reaching each detector to be 90° out of phase at zero rotation rate of the loop. Such a 90° shift is achieved in the apparatus of FIG. 1, by means of the bias cell 28, which shifts the wave 23 passing in one direction therethrough by 90°, while causing no shift in the phase of a beam 22 passing in the opposite direction therethrough.

A bias cell 28 which can phase shift a beam travelling in one direction by a different amount than a beam travelling in the opposite direction along the same path, by a precisely controlled amount such as 90°, can be difficult to construct and operate. One type of device which could be utilized is a Faraday cell which includes a coil disposed about a wave guide for establishing a magnetic field that retards circularly polarized waves moving in one direction and advances waves moving in the opposite direction. However it is found in practice that such a device is bulky and difficult to embody in single mode waveguide form.

In accordance with the present invention, a phase difference between light beams moving in opposite directions, such as 90° at zero loop rotation, is established not by utilizing a continuously operated nonreciprocal device such as a Faraday cell, but by utilizing a device in a time controlled manner. That is, a train of brief pulses of laser light is utilized whose beam-split components will pass in opposite directions through the bias cell 28 at different times, in combination with a circuit which turns on the bias cell 28 while one component is moving in a first direction therethrough and which turns off the bias cell at a different time when the beam component moving in the opposite direction passes through the cell. This permits a bias cell device to be utilized which operates reciprocally, to affect waves moving in opposite directions in a nonreciprocal manner, although nonreciprocal devices could also be utilized in a time controlled manner.

In one example of time controlled operation, the laser 14 can be operated to generate a pulse of one microsecond duration, which is split at the beam splitter 18 into two pulse portions 20, 22 of one microsecond length. The pulse 22 immediately passes through the bias cell 28, which is then in a first state at which it does not delay (by more than a predetermined amount) the phase of any wave passing therethrough. The other pulse 20 passes through the loop 24, which may include a long optic fiber of three kilometers length and having an index of refraction of about 1.5. It requires about 15 microseconds for the pulse to pass through such a loop 24. Immediately prior to the pulse 23 emerging from the loop, the bias cell 28 is operated to a second state to delay the phase of any light beam passing therethrough (in either direction) by 90° more than any phase shift occuring in the first state of the cell). Thus, at the time when the returning pulse 23 passes through the bias cell 28, the pulse 23 will undergo a 90° phase shift, to produce the wave 30. By thus time controlling the bias cell, in conjunction with time control of the light beam, it is possible to use a bias cell 28 of compact design, which requires small operating voltage and which operates reliably and with great linearity. It should be understood that time control can be accomplished not only by generating a brief pulse from the laser 14, but also can be controlled by the use of shutters placed along the path of the light beams to allow only controlled portions of the laser output to reach the light detector.

Figure 2:
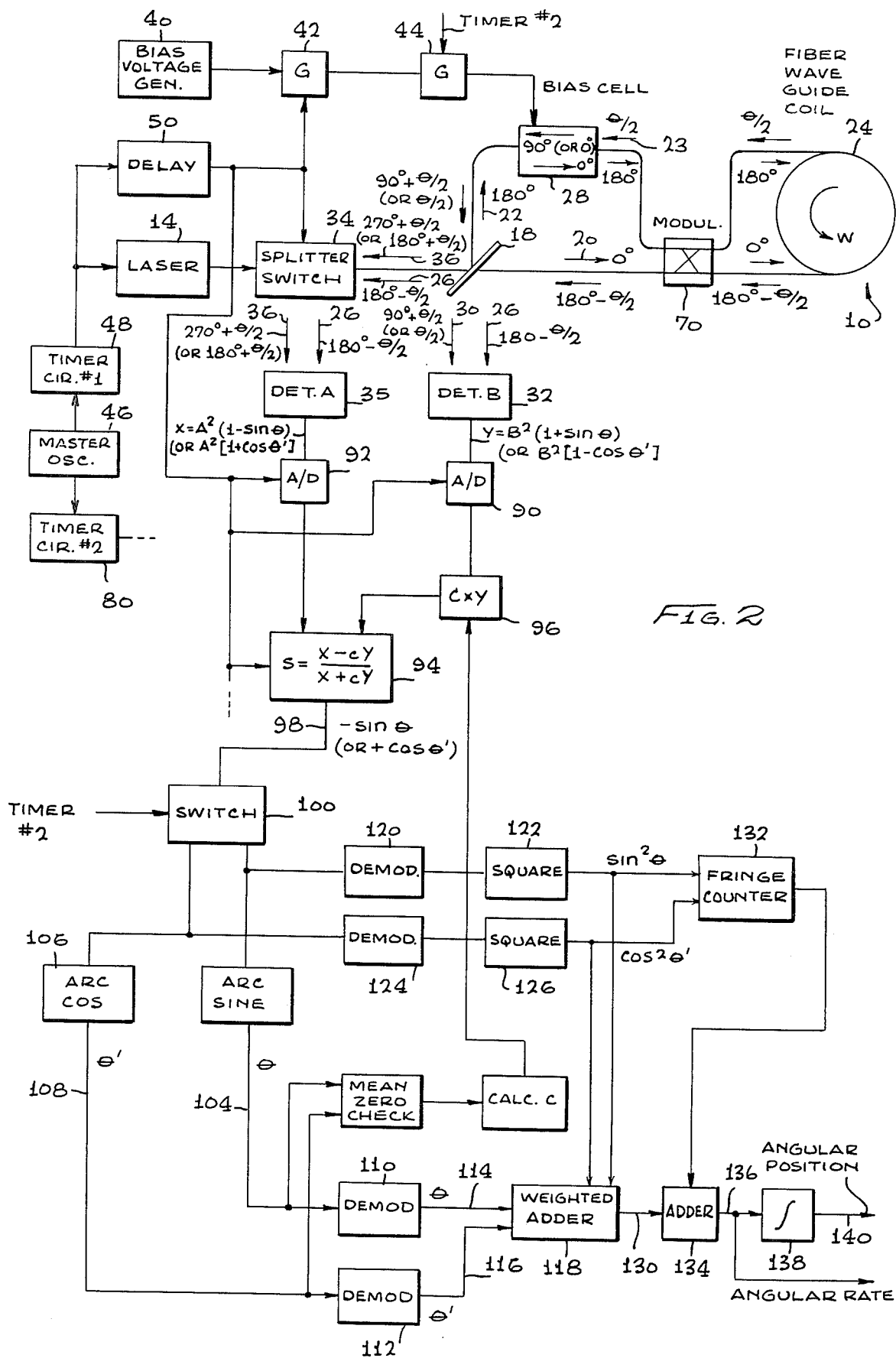
FIG. 2 is a more detailed block diagram view of the gyroscope system of FIG. 1.

FIG. 2 is a block diagram that shows more details of the optical gyroscope 10. The bias cell 28 is energized by a bias voltage generator 40 whose output passes through a pair of gates 42, 44 to the bias cell 28 to energize it so as to phase delay light passing in any direction therethrough, with the output of the generator 40 controlled to increase the phase shift by 90° when it supplies the current. The timing of the circuit is controlled by a master oscillator 46 which controls a first timing circuit 48. The output of the first timing circuit 48 is delivered to the laser 14 to cause the immediate generation of a brief laser pulse. The same timer circuit output is delivered through a delay device 50 which produces a 10 microsecond delay, and then opens the gate 42. Thus, after 10 microseconds, current from the bias generator 40 can pass through the gate 42 to reach the bias cell 28. During the first 10 microseconds after the laser pulse is generated, the bias cell 28 is not energized and the beam split pulse 22 can pass through the bias cell 28 without excess retardation. However, by the time the returning wave 23 has passed through the 3 kilometer loop 24 to reach the bias cell 28, 15 microseconds will have elapsed, and by that time the bias cell 28 will already be energized. Accordingly, when the returning pulse 23 passes through the bias cell, the pulse 23 will undergo a 90° phase shift.

The same time-dependent control of a laser pulse can be utilized to operate the initial splitter 34 which allows light from the laser 14 to reach the beam splitter 18, but which causes the returning light beams 26, 36 to be diverted towards the detector 35. This is accomplished by utilizing a bi-directional splitter switch 34 which can be operated in a first state wherein it permits light to pass directly therethrough, and in a second state wherein it diverts the light. In the first state of the splitter switch 34, it allows light from the laser 14 to pass therethrough to reach the beam splitter 18, and if it continued to operate in the first state it would allow the returning beams 26, 36 to return therethrough to reach the laser 14. However, the system is operated so that soon after the laser pulse passes through the splitter switch 34, the switch is operated in a second state, wherein it will divert the beams 26, 36 towards the detector 35. Thus, by operating the splitter switch 34 at the appropriate time, and by utilizing brief pulses from the laser 14, an effective beam splitter can be obtained by utilizing a bi-directional device. The advantage of a splitter switch 34 over a more conventional non-bi-directional beam splitter, is that the splitter switch 34 permits the entire forward pulse from the laser 14 to pass therethrough, instead of passing only one half of the laser pulse intensity. Also, by preventing the returning pulses 26, 36 from reaching the laser 14, the splitter switch eliminates interactions between the returning pulse and the laser.

As discussed above, the use of a bias cell 28 assures that the two light beams reaching each detector 32, 35 are 90° out of phase at a zero rotation rate of the fiber optic loop 24. As shown in FIG. 4, this assures that the system operates at the point 42 in FIG. 4, wherein any slight change in phase difference between the two beams of a pair, results in a substantial change in the intensity of light falling on a detector. The operation of a system at the point 42, enables the accurate measurement of small rotation rates of the loop or rates for which the phase induced rotation approaches an integer multiple of 180°. However, where there are high rotation rates, which would cause a phase shift θ due to loop rotation which approached 90° or an odd multiple of 90°, then the operating point of the system might be near point 40 or point 41 wherein there is no measurable change in light intensity for small additional changes in phase offset between the two beams. Operation near point 40 or 41 is unacceptable not only because of poor accuracy, but also because it then cannot be determined whether any change in light intensity represents a decrease or increase of the phase offset angle from the point 40 or 41. That is, if the light intensity decreases from the peak at 40, this could be due to the rotation rate increasing or decreasing, and it cannot be determined which is happening. One way of avoiding such inaccuracy and ambiguity, is to utilize a null seeking system which always maintains the phase offset angle between the two beams reaching a detector, at 90°. A somewhat simpler system can be constructed which is non null seeking, by specifically enabling the system to accurately sense large rotation rates which produce a phase shift θ through the loop 24 which is close to an odd multiple of 90°.

Figure 3:
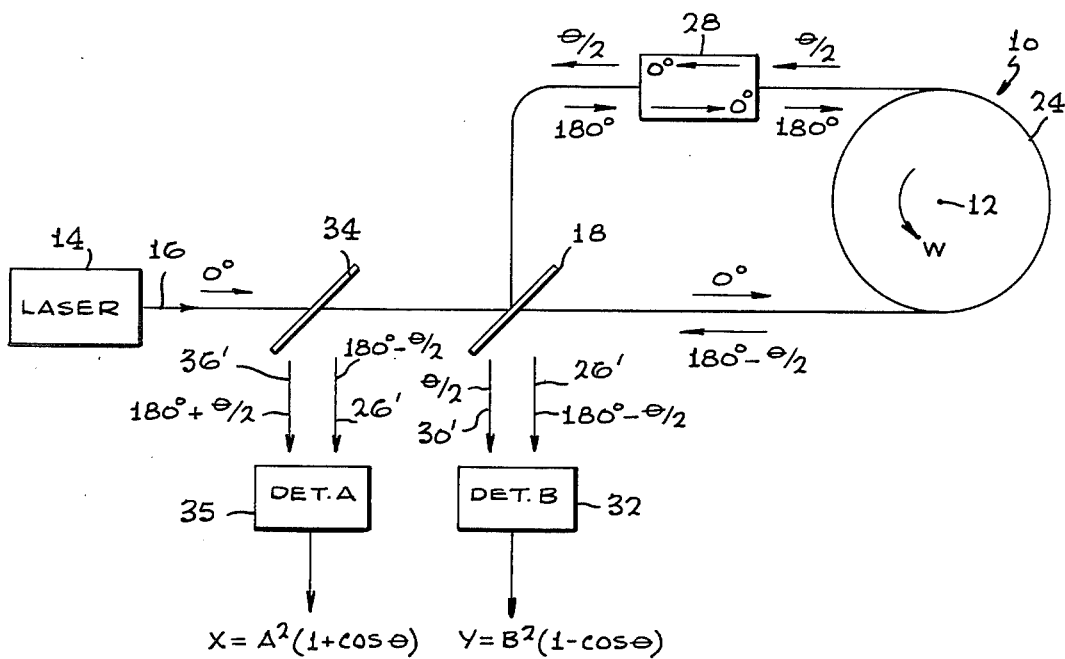
FIG. 3 is a simplified view of the gyroscope system of FIG. 1, showing another mode of operation thereof.

FIG. 3 illustrates the system of FIG. 1, but with the system operated in a different mode than that indicated in FIG. 1. In FIG. 3, the bias cell 28 is always maintained in a constant state, so that it does not cause light travelling in one direction therethrough to undergo a different phase shift than light travelling in the opposite direction (i.e., light passing therethrough undergoes the same phase shift regardless of the direction of travel therethrough). As a result of this mode of operation, the two beams such as 26', 36' reaching the detector 35 will be in phase at zero rotation of the loop 24, instead of 90° out of phase. Similarly, the two beams 26', 30' reaching the detector 32 will be 180° out of phase at zero loop rotation, instead of 90° out of phase. As a result, when the loop 24 is rotating rapidly enough for θ to be close to 90°, then the phase difference of beams reaching each of the detectors will be close to 90°, and therefore during such rapid loop rotation the system will operate close to the point 42 in FIG. 4. A system which utilized the mode of operation indicated in FIG. 1 for small angular rotations of substantially less than 90° (e.g., for up to ±45°), and which utilized the mode of operation indicated in FIG. 3 for rapid rotation rates that produced a θ of ±45° to ±135°, would enable the optical gyroscope to accurately and unambiguously measure rotation rates within a wide range. It may be noted that the first mode of operation shown in FIG. 1, wherein there is a 90° offset angle at zero loop rotation, is largely linear and sensitive (the intensity vs. offset angle has a considerable slope) within about 45° of the center (90° offset) point, or in other words, where θ is between about −45° and +45° as indicated for the range R in FIG. 4. It is also largely linear at higher rotation rates of a multiple (0,1,2 etc.) of 180° (i.e. 0°, 180°, 360°, etc.) and within 45° of such multiples of 180°. Similarly, the second mode of operation shown in FIG. 3, wherein there is a 0° total offset angle at zero loop rotation is largely linear and sensitive at a θ of greater than ±45°, or in other words, where θ is between ±(45° and 135°). The second mode is also useful for a θ equal to an odd multiple of ±90° (i.e. ±90°, ±270°, ±450°, etc.) and within 45° of such odd multiples of 90°.

The system shown in FIG. 2 enables operation in both of the modes shown in FIGS. 1 and 3, to produce high accuracy and definiteness of rotation sensing for a wide range of angular rates of rotation. The modes of operation of the system of FIG. 2 can be best understood by considering it in conjunction with the timing diagram of FIG. 5, which shows the operation of various elements of the system at different times. The graph 60 of FIG. 5 shows that a pulse is released from the laser at zero time, and one beam-split portion of the pulse completes passage through the three kilometer wave guide loop 15 microseconds later. Graph 62 shows that between 10 and 20 microseconds, the bias cell 28 is operated, so that only the pulse 23 of FIG. 2 is retarded by 90° in passing through the bias cell. Graph 64 shows that the splitter switch 34 is operated between 10 and 20 microseconds, to divert the returning pulse towards the detector 35 of FIG. 2.

FIG. 5 shows that at 30 microseconds, a second pulse (#2) is released from the laser, and it is acted upon in a similar fashion as the number one pulse, so that at the 45 microsecond time when the second pulse completes the three kilometer loop, the bias cell has already been operated to a state to produce a 90° phase shift and the splitter switch 34 in a state to divert the returning beams. At 60 microseconds, a third pulse (#3) is released from the laser. However, at 75 microseconds, when the third pulse has returned from passing the three kilometer loop, the bias cell is not operated to produce any phase shift. Thus, this system then operates in the second mode indicated in FIG. 3. However, at the 75 microsecond time, the splitter switch 34 will be in a state to divert the returning beams to the detector 35. The same mode of operation continues for the number four pulses which is released at 90 microseconds and which returns at 105 microseconds. It may be noted that FIG. 5 includes a graph 66 indicating the operation of a modulator designated as 70 in FIG. 2. The modulator 70 can operate on every other pulse emitted from the laser, so that alternate pulse portions 20, 22 move in different directions through the loop 24. As described in detail in our earlier patent application, of which this is a continuation in part, such modulation produces an alternating current signal output from the detectors, which avoids errors due to drift.

FIG. 2 shows a timer circuit 80 whose output is delivered to a gate 44 in series with a conductor 82 leading to the bias cell 28. During operation of the gyroscope in the first mode of FIG. 1, the gate 44 can be left open so that the bias cell is operated between 10 and 20 microseconds, and between 40 and 50 microseconds, as shown for graph 60 in FIG. 5. However, the timing circuit 80 then closes the gate 44 for a period such as 60 microseconds, so that the bias cell is no longer activated and therefore the gyroscope can operate in the second mode indicated in FIG. 3.

The processing of the outputs of the detectors 32, 35 of FIG. 2 can be controlled to automatically generate an accurate indication of loop rotation for a wide range of rotation rates. When the system is operated in the first mode which utilizes bias cell 28, the output of the detector 35 is a light intensity X which equals $A^2(1-\sin\theta)$, where A is the peak amplitude of each of the beams 26, 36 falling on the detector 35 and $\theta$ is the difference in phase caused by rotation of the loop. In a similar manner, the output of the detector 32 is $B^2(1+\sin\theta)$, where B is the peak amplitude of each of the beams 26, 30 incident on the detector 32. The outputs of the detectors 32, 35 are delivered through analog-to-digital converters 90, 92 whose outputs are delivered to a normalized signal calculating circuit 94. It may be noted that the output of one of the converters 90 is passed through an adjusting circuit 96 which multiplies the detector output Y by a constant c, where c equals $A^2/B^2$. That is, where the peak intensity of the beams reaching the two detectors 32, 35 are identical, $A^2$ and $B^2$ will be equal and c will equal one, and where there is a slight difference as due to some absorption of light between the splitters 34 and 18, this difference is adjusted for by the circuit 96. In the case where $A^2$ equals $B^2$, (so that c=1) then the output S of circuit 94 is:

$$S = \frac{X-Y}{X+Y} = \frac{A^2(1-\sin\theta) - A^2(1+\sin\theta)}{A^2(1-\sin\theta) + A^2(1+\sin\theta)} = -\sin\theta$$

Thus, the circuit 94 produces an output proportional to $\sin\theta$ and which is independent of moderate changes in the intensity of the light beams falling on the detectors.

Where the optical gyroscope operates in the second mode wherein the bias cell 28 is not operated, then the outputs of the detectors 32, 35 are different. In that case, the output of detector 32 equals $B^2(1-\cos\theta')$ while the output of detector 35 is $A^2(1+\cos\theta')$. (The term $\theta'$ is utilized here to indicate that the measured offset phase angle due to loop rotation may be slightly different in a mode one measurement, as compared to the level in a later mode two measurement.) After these signals are fed through the converters 90, 92 to the circuit 94, an output on line 98 of the circuit 94 is obtained which is proportional to $-\sin\theta$ or $+\cos\theta'$. Thus, when the system operates in the first mode, the output on line 98 is proportional to $-\sin\theta$, and when the system operates in the second mode, the output on line 98 is proportional to $+\cos\theta'$.

When the system operates in the first mode so the output on line 98 is $-\sin\theta$, then the signal passes through a switch 100 to an arc sine-calculating circuit 102, whose output on line 104 is proportional to the angle $\theta$ representing the rotation rate of the loop. On the other hand, when the system operates in the second mode so that the output on line 98 is proportional to $\cos\theta'$, that output is passed through the switch 100 to another calculating circuit 106 which calculates the arc cosine of the signal, so that the output on line 108 is proportional to $\theta'$. The signals on lines 104 and 108 pass through demodulator circuits 110, 112 that operate in synchronism with the modulator 70 to cancel the effect of the modulation. Thus, the signal on line 114 represents a $\theta$ calculated during operation of the system in the first mode wherein the generated $\theta$ is accurate and definite for small angular rotations (or where $\theta$ is near a multiple of 180°), while the signal on line 116 represents the $\theta'$ derived during operation of the system in the second mode wherein $\theta'$ is accurately calculated for values close to 90° (or any odd multiple of 90°).

In order to calculate a $\theta$ which will be accurate and definite throughout a wide range of $\theta$ values, a weighted adder circuit 118 is provided. The weighted adder circuit 118 calculates the following value:

$$\theta = \sin^2\theta \times \theta' + \cos^2\theta' \times \theta,$$

where the values $\theta$ and $\theta'$ are the outputs on lines 114 and 116. $\sin^2\theta$ is the output from switch 100 which has been demodulated by a demodulator 120 and squared by a squaring circuit 122. $\cos^2\theta'$ is the output from switch 100 in the second mode, after demodulating by another demodulator 124 and squaring by a squaring circuit 126. Thus, the output on line 130 from the weighted adder 118 is $\theta$ which represents the rate of angular rotation of the loop 24. For small rates of angular rotation wherein $\theta$ is much less than 90°, the major component of $\theta$ is the term $\cos^2\theta' \times \theta$. When $\theta$ approaches $\pm 90°$, the major component of $\theta$ is $\sin^2\theta \times \theta'$, and the $\cos^2\theta'$ component approaches zero. Thus, the output of the weighted adder 118 automatically increases the weighting of the $\theta$'s derived during the different modes of operation, so that the mode which generates the most accurate value of θ at any given time is more heavily weighted, and with the degree of weighting varying with the accuracy.

It should be noted that the output on line 130 from the weighted adder does not increase past ±90°. Accordingly, it is also necessary to utilize a fringe counter 132 to count the number of times the angle has passed an odd multiple of a ±90° point (the point of maximum signal difference at the detector), and to add that to the output of the weighted adder on line 130. This is accomplished by a second adder 134, whose output is equal to 180° times the number of fringes counted by the fringe counter 132, plus the angle delivered over line 130. The output 136 from the adder represents the angular rate of rotation of the loop 24, that is the angular rate of rotation times a constant dependent on the turns of the optic fiber coil. This output is also passed through an integrator 138 whose output on line 140 represents the angular position of the loop with respect to its angular position at an initial starting point.

Figure 6:
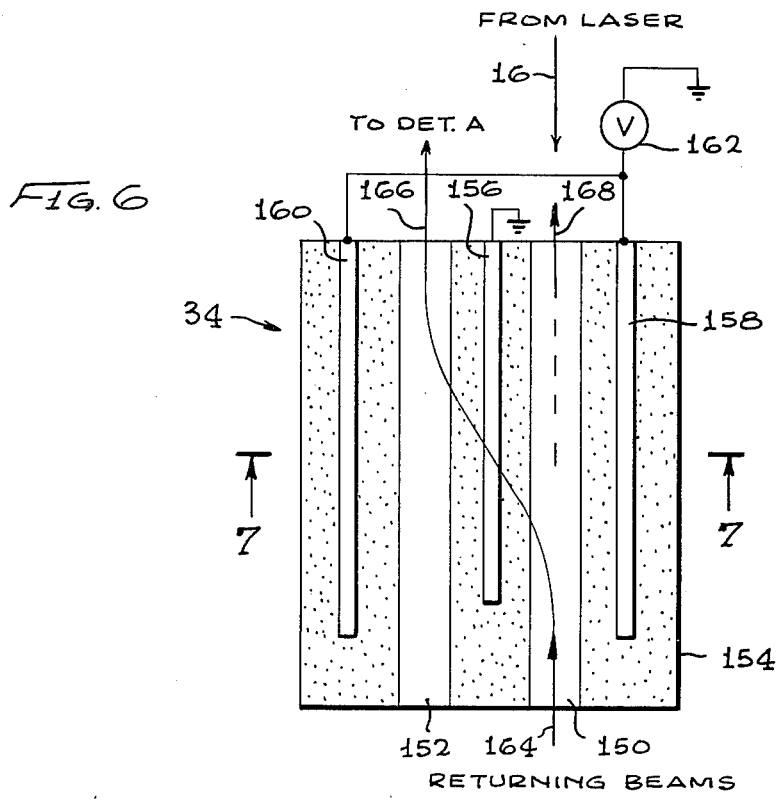
FIG. 6 is a plan view of the bias cell of FIG. 2.
Figure 7:
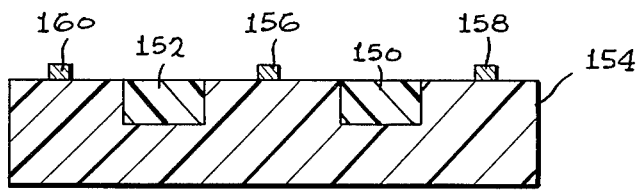
FIG. 7 is a view taken on the line 7—7 of FIG. 6.

FIGS. 6 and 7 illustrate one form of a splitter switch 34 which can be utilized to pass a forward beam from the laser 14 to the beam splitter 18, and yet to divert the returning beams 26, 36 towards the detector 35. The splitter switch or diverter 34 includes a pair of wave guides 150, 152 which can be formed of titanium diffused into a substrate 154 of lithium niobate or lithium tantalate. A grounding electrode 156 lies between the wave guides 150, 152 while another pair of electrodes 158, 160 lies on the sides of the wave guides opposite the grounding electrode. The two electrodes 158, 160 are connected together and to a voltage source 162. When a voltage (such as 5 volts) is applied by the voltage source 162, a returning beam 164 is diverted from the wave guide 150 to the other wave guide 152, to a path 166, by a "waveguide coupling" effect. However, when the voltage is removed from the electrodes 158, 160, such diversion of the beam does not occur, and the returning beam 164 continues straight through the wave guide 150 to exit as a beam at 168. This diverter device, which has been known, has been previously utilized for switching information-carrying light beams, and other electrode configurations are possible to accomplish the same purpose.

The device 34 is a bi-directional device, in that when the voltage supply 162 is energized, beams entering either of the wave guides 150, 152 will be diverted to the other wave guides, and when the voltage source 162 is at zero such diversion does not occur. However, the diverter device 34 can operate essentially as a directional device, by applying no voltage 162 when the pulse 16 is initially emitted from the laser, to pass the pulse therethrough, and by then applying the voltage from the source 162 so that when the light beam components have returned after a time such as 15 microseconds required to traverse the 3 kilometer-long optic fiber loop, the returning beams along the path 164 will then be diverted to the path 166 to reach the detector 35.

The same basic device 34 can be utilized as the bias cell 28 of FIG. 2, by constructing half of it; that is, by constructing only one of the wave guides 150, and the pair of electrodes 156, 158. In that case, the application of a voltage between the electrodes 156, 158 changes the index of refraction of the wave guide 150, to change the time required for a light beam to pass therethrough. Whether the index of refraction increases or decreases when a voltage is applied between the electrodes 156, 158, depends on the particular material of the wave guide 150 and its crystallographic orientation.

Figure 8:
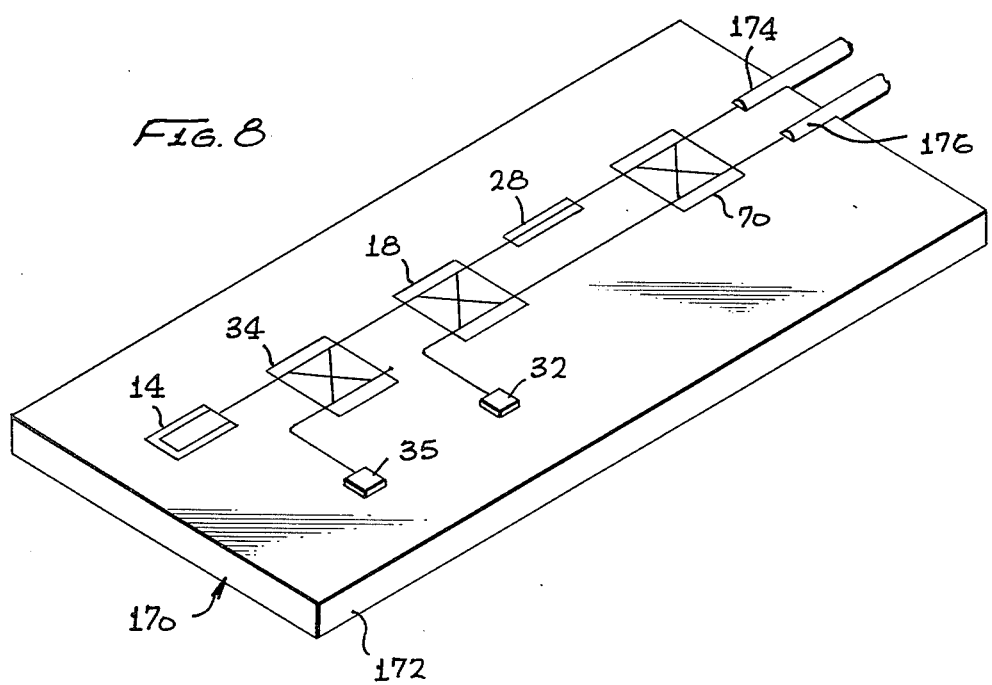
FIG. 8 is a perspective view of a portion of the system of FIG. 2, showing a manner of construction thereof.

The system of FIG. 2 can be constructed in three major parts, including an integrated optics chip having a construction shown in FIG. 8, a microprocessor and associated circuitry, and a multiturn fiber optic device that provides the loop 24. FIG. 8 illustrates one construction of an integrated optics chip 170, which includes a lithium niobate substrate 172 and various optic control elements formed thereon. The beam splitter switch 34 and bias cell 29 can be formed on the substrate, in the manner shown for the device of FIGS. 6 and 7. The modulator 70 and the beam splitter can have the same construction as the device of FIGS. 6 and 7. The laser 14 can be applied by hybrid techniques to the same substrate 172. The detectors 32, 35 can be similarly applied to the substrate. A pair of wave guide terminations 174, 176 are provided along one edge of the chip to connect to a multi-turn fiber optic wave guide. A group of electrical terminals (not shown) can also be provided to enable connection to a microprocessor and other circuitry to activate all the elements, read out the signals, and make the calculations indicated for the circuitry of FIG. 2 that connects to the light detectors.

It is important that the two light beam portions that pass in opposite directions through the loop 24, have identical polarization states throughout the length of the fiber optic wave guide. Otherwise, the effective path lengths of the two beam portions may vary by many wave lengths and the difference will be a sensitive function of temperature, stress, and vibration of the device. Since the system is designed to measure small changes in relative phase of the two light beam portions, the effect of such difference in polarization would make the optical gyroscope system useless. The light beam emerging from the laser could be linearly polarized by passing it through a polarization plate, but such polarization state can deviate along the long length of the multi-turn loop. This is because a fiber wave guide, like any other optical glass component, has numerous regions of birefringence and optical activity which tend to alter the polarization state of light passing therethrough. Furthermore, the core of the fiber wave guide has a cross section that departs from a circle due to defects introduced during the drawing process used in forming the wave guide. In addition, there are other phenomena which can affect circularly or elliptically polarized light. A magnetic field extending along a length of a fiber wave guide will retard circularly or elliptically polarized light moving in one direction more than light moving in the opposite direction, this phenomenon commonly being referred to as the Faraday effect.

Figure 9:
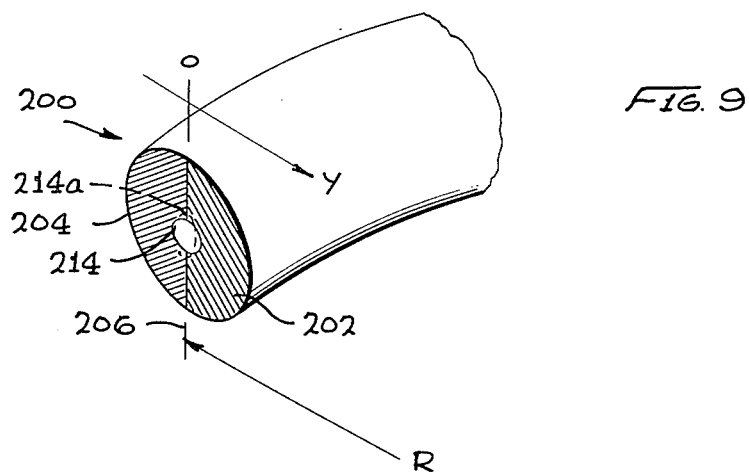
FIG. 9 is a partial enlarged view of the loop portion of the system of FIG. 2.

In accordance with one aspect of the present invention, linearly polarized light is utilized to avoid the effects of magnetic fields, and uncontrolled rotation of the plane of polarization is avoided by physical stressing of the fiber optic wave guide. The fiber optic wave guide 200 of FIG. 9 is formed so that one side 202 is maintained in compression and the opposite side 204 is maintained in tension. It has been found that this results in linearly polarized light maintaining its plane of polarization along a plane 206 extending through the neutral axis 206 of stress of the wave guide. It has been found that such stressing of the wave guide 200 can be accomplished by winding a nominally circular cross-section fiber wave guide about a small diameter coil form, with care being taken that no significant bends occur out of the plane of the coil, so that the coil is substantially free of bending about any axis angled by more than a few degrees from the axis of the coil. That is, that there is no sudden change in the neutral axis of stress along the wave guide. It is found that as a result of such winding, linearly polarized light with the electric vector extending along the neutral axis of stress 206 will be propagated throughout the length of the wave guide without unpredictable or random changes of polarization that could vary the effect of path length of light beams travelling in opposite directions through the wave guide, in spite of regions of moderate defect tending to change the plane of polarization.

As shown in FIG. 9, the index of refraction of the wave guide varies from the nominal value at the midline point along the line 206, and increases towards the compressed region 202 of the fiber and decreases towards the region 206 under tension. It has been found that linearly polarized light having an electric vector extending along the line 206 which is parallel to the axis of the coil, remains polarized in that plane, while linearly polarized light with the electric vector in any other plane is at least partially converted over a short distance of perhaps several inches of wave guide into the preferred orientation. Stabilization of the polarization establishes stable fringe patterns at the light sensors, which are independent of temperature, vibration, and magnetic fields.

The difference in index of refraction for the two polarization planes at any location within the fiber core, assuming no axial tension, is given by the formula $$\Delta n = [E \Delta x (C_1 - C_2)/R]$$

where E equals Youngs modulus which is about $7.2 \times 10^3$ kg/mm$^2$ for fused silica glass, $C_1$ and $C_2$ are the stress optic coefficients for the two polarizations which are $-6.08 \times 10^{-6}$ mm$^2$/kg and $-4.15 \times 10^{-5}$ mm$^2$/kg respectively, R is the fiber bend radius in mm and $\Delta x$ is the location relative to the neutral plane 206 in FIG. 9. As an example, if we use a fused silica fiber with a core radius of 2.25 microns wound on a coil form with a radius of 100 mm, then the maximum stress induced birefringence in the fiber core is $5.7 \times 10^{-6}$ while the residual birefringence found in good quality fiber is typically one fourth wavelength in 50 cm, or about $5 \times 10^{-7}$. Thus, randomly occuring birefringence is typically much smaller than the stress-induced birefringence for planar-wound fiber optic coils of 200 mm or less diameter.

It is found experimentally that when wound on coils between a few inches and 12 inches diameter, the fiber coil is effective in establishing and maintaining the plane of linearly polarized light parallel to the axis of the loop. When wound onto a coil of one meter diameter, it was found that the coil did not maintain linearly polarized light in a constant plane. It appears that when the 85 micron diameter fiber is wound onto a radius of 0.5 meter, as in the foregoing example, there is insufficient variation in stress across the diameter of the fiber to rely upon this variation in stress to establish or maintain the plane of polarization.

Figure 10:
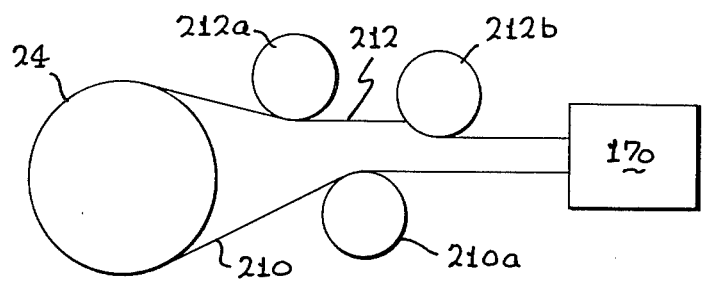
FIG. 10 is a plan view of a test setup, which utilizes the loop portion of FIG. 9.

It is found that in laboratory experiments wherein the fiber optic wave guide was provided with long ends beyond the multi-turn loop, to provide excess fiber to work with to reach other devices and to permit cutting off, that polarization can be maintained by maintaining long lengths of fiber in relatively tight loops. FIG. 10 shows the loop 24 with long ends 210, 212, extending therefrom, which are maintained in tight coils along most of their length, in order to stress the fiber so as to control the plane of polarization so it does not deviate at any location. It may be noted that the ends are wound into loops at 210a and 212a and 212b which are wound in directions opposite to the winding of the loop 24. The direction of winding does not affect the plane of neutral stress in the bent fiber, and therefore this different direction of winding can be utilized. Although winding of an optical fiber so that there is no suddent change in the neutral axis of stress, can be utilized where a loop of fiber is required, it is possible to stress the optic fiber in other ways such as by prestressing during formation of the optic fiber, so that build-in stresses are provided even when the fiber is not maintained in a coil. It also may be noted that forming the core of the fiber in a noncircular shape can aid in maintaining the polarization plane along the longest axis of the core. Thus, forming the fiber core 214 into an oval 214a can help in maintaining polarization along the plane 206.

Thus, the invention provides an optical gyroscope system which can be constructed compactly and operate reliably to measure rotation rates within a wide range with definiteness and accuracy. Control of light beams is enhanced by utilizing brief pulses of light, each of a duration less than the time required for a pulse to pass through the loop which extends along the major portion of the light path length. It may be noted that electromagnetic waves of a range of wavelengths can be utilized outside the visible range, all of which can be referred to as light. The phase delay of one light beam component travelling in one direction relative to another component traveling in the opposite direction along the same path, can be accomplished by placing a bias cell in a delaying mode (or advancing mode) only during the brief time when one of the beam components is passing therethrough but not when the oppositely travelling beam component passes therethrough. A bidirectional bias cell can be used. In a similar manner, a switcher device which allows light to pass from the laser towards a beam splitter, but which diverts a returning pair of light beams against a detector instead of into the laser, can include a bidirectional device whose state is changed after the initial laser pulse passes by, so that the returning pulse is diverted. The system can provide definite and accurate measurements of rotation rates over a wide range of rotation rates, by operating it in a first mode wherein waves travelling in opposite directions are placed 90° out of phase at zero loop rotation, and then operating the system so that waves travelling in opposite directions are not altered in relative phase at zero loop rotation. The first mode permits operation of the interference beam detector at a location of maximum sensitivity near a zero loop rotation rate or rates for which the rotation-induced phase difference approaches an integer multiple of 180°, while the second mode causes operation at highest sensitivity when the rotation rate causes a phase offset close to an odd multiple of 90°. The signals representing offset angles during the two different modes of operation can be combined in a manner that generates an angular rotation rate indication that is weighted towards one mode or the other depending upon the angular offset, so that an accurate angular indication is continuously generated. A fringe counter can be utilized in addition to the calculating circuitry to indicate the angular rotation over a very wide range.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In an interferometer gyroscope which includes means defining a wave path that includes a portion extending in a loop, means for directing electromagnetic waves in opposite directions along said wave path, and means responsive to the phase difference of the waves passing in opposite directions along said wave path for indicating rotation of the loop, the improvement comprising:
   phase shift means disposed along said wave path and controllable to shift the relative phase of the waves travelling in opposite directions by an odd multiple of 90° at zero rotation of the loop; and
   mode control means for controlling said phase shift means so that it alternately operates in a first mode wherein it shifts the relative phase of waves directed to travel in opposite directions at substantially the same time through said loop, and then in a second mode wherein it does not shift the relative phase of waves travelling in opposite directions at substantially the same time through said loop.

2. The improvement described in claim 1 wherein:
   said means for indicating rotation of the loop includes signal processing means responsive to interference patterns of waves which have travelled in opposite directions through the loop at substantially the same time, for alternately generating signals representing substantially the arc-sine and the arc-cosine of a function of the intensity of the interference patterns.

3. In an optical gyroscope which includes a light conduit with a portion which extends in a loop, a light source, and means for directing light from the source in opposite directions through the loop portion and onto at least one detector, the improvement comprising:
   an energizable bias means controllable to delay or not delay the phase of light moving in one direction through the loop portion by a different amount than light moving in the other direction; and
   mode control means for alternately controlling said bias means in a first mode to phase delay light moving in different directions by a different amount, and then in a second mode to avoid phase delaying light moving in different directions by different amounts.

4. The improvement described in claim 3 including:
   signal processing means responsive to the output of said detector and operated in synchronism with said mode control means, for generating signals on first and second switch outputs respectively representing the output of said detector at different controlled states of said bias means;
   said signal processing means being constructed to generate a signal representing the arc-sine and then the arc-cosine of a function of the detector output, in response to said mode control means operating in said first and second modes.

5. The improvement described in claim 3 including:
   signal processing means responsive to the operation of said mode control means and said detector, for generating a signal representing $\theta' \times \sin^2\theta + \theta \times \cos^2\theta'$, where $\theta$ is an odd multiple of 90° plus the rotation induced difference in phase of a pair of light beams incident on said detectors during operation of said mode control means in said first mode when the phase difference produced by said bias means is an odd multiple of 90°, and $\theta$ is the rotation induced difference in phase of a pair of light beams incident on said detectors during operation of said mode control means in said second mode.

6. In an optical gyroscope which includes a light conduit with a portion which extends in a loop, a light source, and means for directing light from the source in opposite directions through the loop portion and onto a pair of detectors, the improvement of bias cell apparatus for selectively shifting the phase of light comprising:
   phase shift means energizable to change the amount of phase shift of light passing therethrough;
   rapidly operable means for energizing said phase shift means while a first portion of a light beam passing in a first direction through said loop and to said detectors is passing through said phase shift means, but not while a second portion of the light beam which passes in a second direction through said loop and to said detector is passing through said phase shift means; and
   mode control means for operating said rapidly operable means, so that when said mode control means is in a first mode and light passes in opposite directions through said loop and said phase shift means, said phase shift means is operated so light passing in a first direction is phase shifted by a different amount than light passing in a second direction, and later when said mode control means is in a second mode and light passes in opposite directions through said loop and phase shift means, said phase shift means is not operated so light passing in different directions is not phase shifted by different amount, whereby to generate signals at the detectors which are functions, first of the sine of the angular rate of rotation, and then of the cosine of the angular rate of rotation.

7. A method for operating an optical gyroscope to provide high sensitivity at low rotation rates, comprising:
   generating a light beam;
   splitting the light beam into two light components;
   passing the two light components in opposite directions along a path that includes a portion that extends in a loop whose rotation is to be measured; and
   directing the two light components onto two detectors after the beams have traversed said path;
   said step of passing the light components including alternately phase shifting components of the same beam which pass in opposite directions along said path by an odd multiple of 90° relative to one another, and then not phase shifting components of the same beam which pass in opposite directions along said path.

* * * * *